(No Model.) 4 Sheets—Sheet 1.

H. SCHIMPFF.
SEED DRILL.

No. 558,526. Patented Apr. 21, 1896.

Witnesses:
B. J. Ober.
Henry Orth.

Inventor
Hugo Schimpff.
by Henry Orth
atty.

(No Model.) 4 Sheets—Sheet 2.

H. SCHIMPFF.
SEED DRILL.

No. 558,526. Patented Apr. 21, 1896.

Witnesses
B. S. Ober
Henry Orth

Inventor
Hugo Schimpff
By Henry Orth
Atty (No Model.) 4 Sheets—Sheet 3.

H. SCHIMPFF.
SEED DRILL.

No. 558,526. Patented Apr. 21, 1896.

Witnesses:
B. J. Ober
Henry Orth

Inventor
Hugo Schimpff.
by Henry Orth
atty (No Model.)  4 Sheets—Sheet 4.

H. SCHIMPFF.
SEED DRILL.

No. 558,526.  Patented Apr. 21, 1896.

Witnesses:
B. J. Ober
Henry Orth Jr.

Inventor
Hugo Schimpff
by Henry Orth
Atty.

UNITED STATES PATENT OFFICE.

HUGO SCHIMPFF, OF HALLE-ON-THE-SAALE, GERMANY.

SEED-DRILL.

SPECIFICATION forming part of Letters Patent No. 558,526, dated April 21, 1896.

Application filed September 24, 1895. Serial No. 563,477. (No model.) Patented in Germany April 29, 1892, No. 69,548; in Denmark April 4, 1894, and in France March 9, 1895, No. 245,676.

*To all whom it may concern:*

Be it known that I, HUGO SCHIMPFF, a subject of the German Emperor, residing at Halle-on-the-Saale, Germany, have invented certain new and useful Improvements in Seed-Drills, (for which I have obtained Letters Patent in Denmark, not numbered, dated April 4, 1894; in Germany, No. 69,548, dated April 29, 1892, and in France, No. 245,676, dated March 9, 1895;) and I do hereby declare the following to be a clear and exact description of the invention.

My invention has relation to seed-drills, and more particularly to that type of seed-drill having distributing-cups the area or capacity of which is adjustable in accordance with the nature of the seed to be sown; and my said invention has for its object certain improvements in the seed-distributing devices, in the adjusting mechanism for said devices, and in the bearings for the feed-shaft, as will now be fully described, reference being had to the accompanying drawings, in which—

Figure 1:
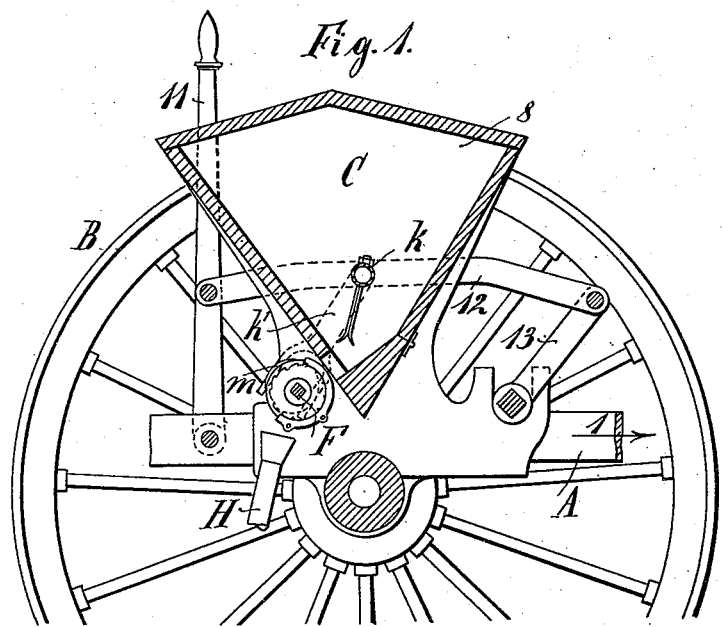
Figure 2:
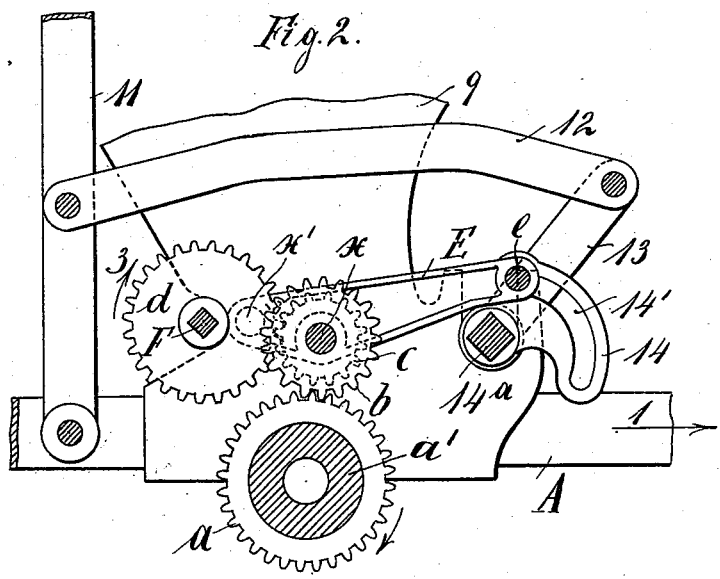
Figure 3:
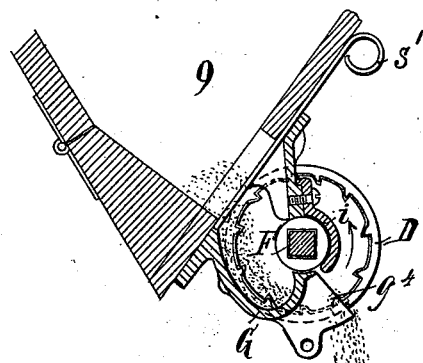
Figure 4:
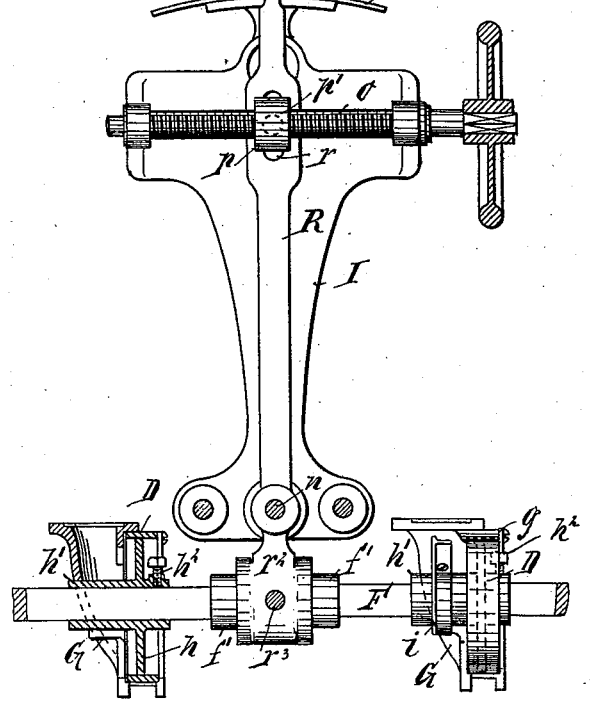
Figure 5:
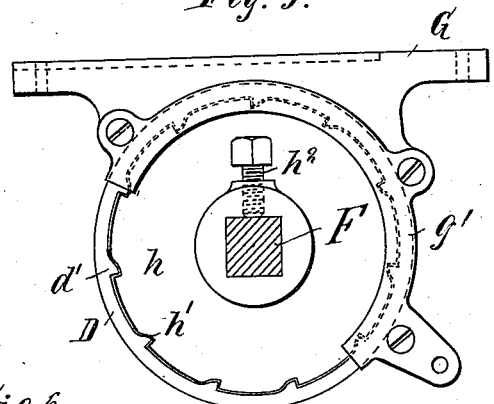
Figure 6:
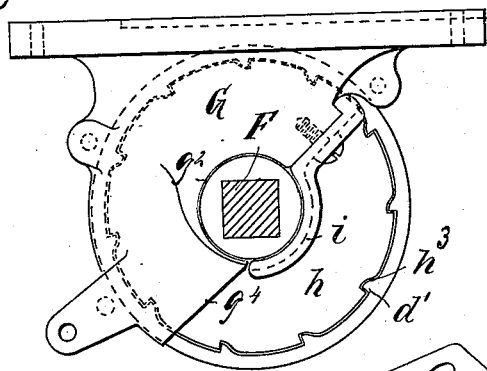
Figure 7:
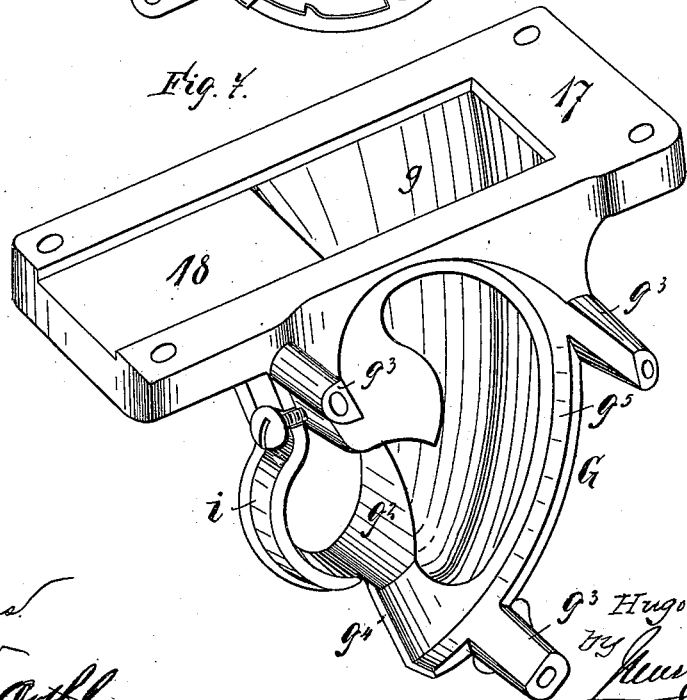
Figure 9:
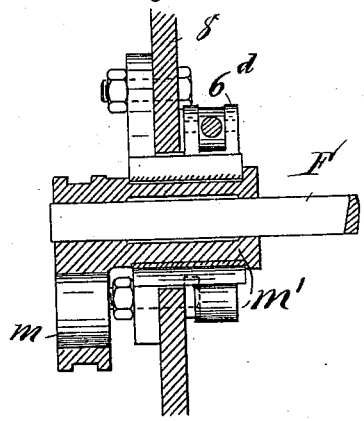
Figure 10:
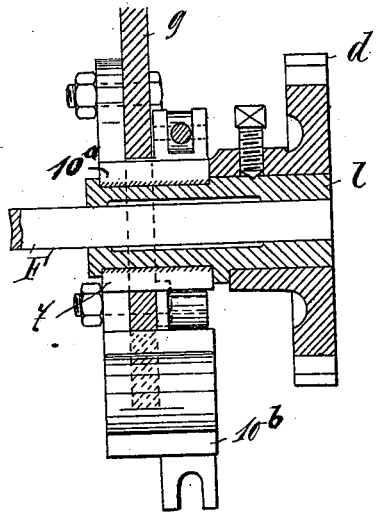

Figures 1 and 2 are sectional elevations of so much of a seed-drill as will be necessary to illustrate and to convey a full understanding of certain features of my invention. Fig. 3 is a sectional view of one of the seed-cups and a portion of the seed-box and a drill or delivery tube. Fig. 4 is an elevation of the devices for adjusting the feed-shaft and therethrough the area or capacity of the seed-cups, two of which being shown, one of them in section. Figs. 5 and 6 are opposite side elevations of a seed-cup, the feed-shaft being shown in section. Fig. 7 is a perspective view of one of the said seed-cups, the distributing devices being removed; and Figs. 8, 9, and 10 are detail sectional views of the feed-shaft bearings.

Referring to Figs. 1 and 2, A indicates a portion of the main frame; B, a portion of the drive-wheel at the left side of the machine. On the hub $a'$ of the drive-wheel at the right side is secured a gear $a$, meshing with a gear $b$, loose on a stud $x$, secured to a lever E, that has its fulcrum $x'$ on the end wall 9 of the seed-box C, secured to the main frame A. The stud $x$ carries also a transmitting-gear $c$, revoluble with gear $b$, and transmitting motion to a gear $d$ on the feed-shaft F, so that when the machine moves in the direction of arrow 1, Fig. 1, the feed-shaft gear is revolved in the direction of arrow 3, Fig. 2, as will be readily understood. The lever E has a pin $e$, that projects into an eccentrical slot $14'$ of a sector 14, secured to a shaft $14^a$, having bearings in the aforesaid wall 9 and the opposite end wall 8 of the seed-box C, and to said stud $14^a$ is secured an arm 13, connected by rod 12 with a hand-lever 11. The object of this arrangement of transmission-gearing for the feed-shaft F is to adapt the transmission-wheel to be thrown out of gear with the gear $a$ and to stop the distribution of the seed from the seed-box C by pulling back the lever 11.

Whenever it is desired, the shaft F, together with the seed-distributing devices, can be removed from the machine. This is desirable not only in case access to the distributing devices is necessary from any cause, but also where imperfect shelter is provided for the machine, or where the latter is exposed to atmospheric influences, so that by removal of the feed-shaft with the distributing devices these may be properly protected or sheltered from such influences. To these ends the bearings for the feed-shaft F are made in two sections hinged together, as shown in Figs. 8, 9, and 10.

Figure 8:
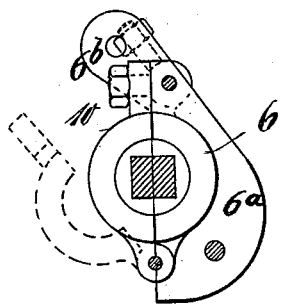

In Fig. 8 I have illustrated the bearing for one end of the feed-shaft F. The movable section 10 is hinged to the fixed section 6, whose bearing-plate $6^a$ is secured to the left end wall 8 of the seed-box C. Said sections are secured together by means of a bolt $6^b$, adapted to pass through the slotted end of said hinged section 10, and by means of a nut, said bolt being journaled in the ear $6^d$ of the fixed bearing-section. The shaft F carries at its left end an eccentric $m$, Fig. 1, provided with an extended hub $m'$, Fig. 9, that fits said bearing, said eccentric acting upon an arm $k'$ on the stirrer-shaft $k$, Fig. 1, for well-known purposes. The bearing at the opposite or right end of the seed-box is of substantially the same construction as the bearing 6 10, the fixed portion $10^a$ of said bearing being secured to the right end wall 9, the hinged section $10^b$ being shown as turned down. (See Fig. 10.) The feed-shaft F carries at this end a bearing-sleeve $l$, on which is secured the gear $d$ above mentioned.

As shown in the drawings, the feed-shaft F is square in cross-section and passes freely through the corresponding bore of the aforesaid sleeve and through the square bore of the hub $m'$ of the eccentric $m$, so that endwise motion may be imparted to the shaft, and it carries the regulating-disks $h$, which are contained in the distributing-rings D in the seed-cups G, and by means of which the capacity of the seed-cups is regulated in a well-known manner. This endwise motion is imparted to the feed-shaft F by means of a two-armed lever R, Fig. 4, fulcrumed at $n$ to a suitable plate I, secured to the rear wall of the seed-box C. The short arm $r^2$ of said lever R is pivotally connected with the shaft F between two collars $f'$, as shown at $r^3$. In order to admit of the removal of the shaft, the said collars may be adjustably connected therewith and the pivot-pin $r^3$ made removable, so that by moving the collars away from the short arm $r^2$ the lever R can be turned to move said short arm clear of the shaft. The long arm of the lever has a longitudinal slot $r$ near its opposite end and is provided at its free end with a pointer $r'$, adapted to travel over a graduated scale S.

The supporting-plate I has two bearings for a screw-shaft $o$, provided with a suitable hand-wheel, and carries a nut $p$, that has a pin $p'$ (shown in dotted lines in said Fig. 4) that projects into the aforesaid lever-slot $r$. It is obvious that when the screw-shaft is revolved in one or the other direction the feed-shaft F will receive endwise motion in one or the other direction, and as the regulating-disks $h$ are rigidly connected with the feed-shaft F a corresponding movement will be imparted to said disks $h$ within their distributing-rings D.

In seed-drills in which a comparatively great number of seeding or delivery tubes are employed it may be found desirable to provide additional bearings for the feed-shaft, in order to steady the same in its revolutions. To this end, instead of providing all of the seed-cups G with an open bearing $g^2$, one or more of such cups may be provided with a retaining-strap $i$, Fig. 7, which strap is detachably connected with the seed-cup G.

The seed-cups G and the distributing devices therefor are constructed as follows, reference being had to Figs. 3 to 7: The seed-cup G is open on one side and has a seed-passage $g$ in communication with the seed-box C and opening into the one side wall of the cup, a flange $g^5$, and posts or pillars $g^3$ on said side wall and the open or half bearing $g^2$ for the shaft F. On shaft F is mounted the regulating-disk $h$, having a hub $h'$, Fig. 4, secured to said shaft by a set-screw $h^2$ and having bearing and endwise motion with the shaft in the aforesaid half-bearing $g^2$ in the seed-cup, the said hub being of such length as to admit of the required endwise movement of the disk. The flange $g^5$, Fig. 7, serves as a seat for the distributing-ring D, which constitutes, as is well known, a lateral enlargement of the seed-cup, said ring being held against displacement by means of a segmental plate $g'$, Fig. 5, secured by screws to the pillars $g^3$, Fig. 7.

As the shaft F, and consequently the disks $h$, revolves in the direction of the arrow, Fig. 3, they act as feeders for and assist the flow of seed to the distributing-rings D, and as the latter revolve with the disks they carry the seed over the edge $g^4$, Figs. 3, 6, and 7, of the seed-cups G, from which the seed drops into the drill-tubes H, Fig. 4.

The distributing-ring D is provided with transverse ribs or ledges $d'$, that engage corresponding recesses $h^3$ in the periphery of the adjustable disk $h$, whereby said ring is revolved, as is well known.

It will be observed that the hub $h'$ of the adjustable disk $h$ has bearing in the semicircular bearing $g^2$ of the seed-cup G and constitutes practically a portion of the rear wall of said cup, the seed being ejected through a passage below said hub leading to the edge $g^4$, and, as is well known, the aforesaid disk $h$ constitutes one of the side walls of the seed-cup. The latter is provided with a suitable head-plate 17 and a guideway 18 for a slide S', Fig. 3, adapted to close or more or less close the entrance to the seed-cup, which is bolted to the rear wall of the seed-box C through the medium of the aforesaid head-plate 17 in register with an opening in said seed-box.

The means for adjusting the discoidal side wall of the seed-cup for the purposes stated have been described above in reference to Fig. 4 and need, therefore, no further description, though I may remark that a most accurate adjustment of the distribution may thereby be effected.

Having thus described my invention, what I claim as new therein, and desire to secure by Letters Patent, is—

1. In a seed-drill, the combination with the seed-box and the seed-cups secured thereto, said cups open on one side and provided with a separable bearing; of a shaft revoluble, and having longitudinal motion in said bearings, and seed-distributing appliances rigidly connected with said shaft and working in the open side of the seed-cups, whereby said appliances can be moved out of their respective cups by longitudinally moving their actuating-shaft, and the latter removed from its bearings.

2. In a seed-drill, the combination with the main frame, the seed-box thereon and the seed-cups secured to said box; of seed-distributing appliances coöperating with the seed-cups to distribute the seed fed thereto from the box, and an actuating-shaft for said distributing devices, said shaft and distributing devices removable together from the main frame and seed-cups without disturbing the latter.

3. In a seed-drill, the combination with the main frame, the seed-box thereon and the seed-cups secured to said box; of the seed-distributing devices coöperating with said cups to distribute the seed fed thereto from the box, and the actuating-shaft for said distributing devices carrying a gear-wheel at one end and an eccentric at the other, said shaft and seed-distributing devices together with the gear-wheel and eccentric removable together from the main frame and seed-cups without disturbing the latter.

4. In a seed-drill, the combination with the main frame, one of the drive-wheels, a gear-wheel on the hub thereof, the seed-box secured to such main frame, the seed-cups secured to said box and open on one side, seed-distributing appliances working in the open side of the seed-cups, a shaft carrying said appliances, and a gear-wheel on one end thereof, said shaft revoluble and movable endwise in separable bearings on the seed-cups and main frame; of the lever E, the gear-wheel $b$ carried by said lever and adapted to gear with the wheels on the distributing-shaft and on the drive-wheel hub, the slotted actuating-segment 14, the hand-lever 11, and suitable connections between said lever and segment, substantially as and for the purpose set forth.

5. In a seed-drill, the combination with the main frame one of the drive-wheels, a gear-wheel $a$ on the hub thereof, the seed-box, the stirrer-shaft $k$ therein and the seed-cups; of seed-distributing devices working within the seed-cups, a shaft F to which such devices are secured, said shaft revoluble and movable endwise in bearings on the main frame and seed-cups, an eccentric at one end of the shaft, a detachable connection between said eccentric and the aforesaid stirrer-shaft $k$, a gear-wheel $d$ on the opposite end of shaft F, and an adjustable transmitting-gear connecting the aforesaid gears $a\ d$, said shaft F together with the mechanism thereon removable bodily from the machine without disturbing the seed-cups.

6. In a seed-drill, the combination with the main frame, the seed-box, the seed-cups secured thereto and open on one side, and separable bearings on said main frame and seed-cups; of seed-distributing appliances working within the open side of the seed-cups, the shaft F to which said appliances are secured, said shaft revoluble and longitudinally movable in the aforesaid bearings, means for revolving said shaft, and appliances detachably connected with such shaft for imparting longitudinal motion thereto, for the purpose set forth.

7. In a seed-drill, the combination with the shaft F carrying collars $f'\ f'$, of the lever R, the short arm of which works between said collars, the long arm of said lever provided with a longitudinal slot, the screw-spindle $o$ revoluble in fixed bearings, and a nut $p$ thereon provided with a pin $p'$ extending into the lever-slot, substantially as and for the purpose set forth.

8. The combination with the seed-box and the shaft F carrying the abutment-collars $f'\ f'$; of the lever R fulcrumed on the seed-box, the short arm $r^2$ of said lever detachably connected with shaft F between the aforesaid collars, the long arm of said lever provided with a slot, the screw-spindle $o$, and the nut $p$ thereon provided with a pin extending into the slot in the long arm of the lever, substantially as and for the purpose set forth.

9. The combination with the seed-box, the bracket I secured thereto and provided with the index-plate S, the screw-spindle $o$, revoluble in bearings on said bracket, the nut $p$ on said spindle provided with a pin $p'$, and the distributing-shaft F carrying abutment-collars $f'\ f'$; of the lever R fulcrumed to bracket I and carrying at its upper end a hand $r'$ movable over the aforesaid index-plate, the long arm of said lever provided with a longitudinal slot into which the pin $p'$ on nut $p$ projects, the short arm of said lever connected with the shaft F between the abutments $f'\ f'$ thereon, substantially as and for the purpose set forth.

10. A seed-cup for seed-drills open on one side and provided with a seed-passage $g$ intersected by a semicylindrical open bearing $g^2$ for the shaft that carries the distributing appliances, and with a seat-flange $g^5$ and pillars $g^3$, substantially as and for the purpose set forth.

11. A seed-cup for seed-drills, open on one side and provided with a seed-passage $g$, a semicylindrical bearing $g^2$ for the shaft of the distributing devices intersecting said passage, a seat-flange $g^5$ and pillars $g^3$; in combination with the removable semicircular strap $i$, substantially as and for the purpose set forth.

12. The combination with the seed-cup G provided with the seed-passage $g$, the semicylindrical bearing $g^2$, for the distributing-shaft, intersecting said seed-passage, the seat-flange $g^5$ and the pillars $g^3$; of the disk $h$ provided with a hub $h'$ fitting in said bearing $g^2$, the endwise-movable shaft F to which hub $h'$ is secured, the distributing-ring D revolved by disk $h$, and the retaining-plate $g'$ secured to pillars $g^3$, substantially as and for the purpose set forth.

In witness whereof I have fixed my signature in presence of two witnesses.

HUGO SCHIMPFF.

Witnesses:
LOUIS LANGE, Jr.,
RUDOLPH FRICKE.